United States Patent

Bravo

[11] Patent Number: 5,916,248
[45] Date of Patent: Jun. 29, 1999

[54] METHOD FOR FEEDING A LIQUID MIXTURE TO THE BEATING CYLINDER OF A SOFT ICE-CREAM PRODUCTION MACHINE, AND AN APPARATUS FOR ITS IMPLEMENTATION

[75] Inventor: Genesio Bravo, Alte di Montecchio Maggiore, Italy

[73] Assignee: Bravo S.p. A., Vicenza, Italy

[21] Appl. No.: 08/891,705

[22] Filed: Jul. 9, 1997

[30] Foreign Application Priority Data

Jul. 10, 1996 [IT] Italy .................................. MI96A1421

[51] Int. Cl.⁶ ........................................................ A23G 9/12
[52] U.S. Cl. .................................. 62/68; 62/342; 99/453; 426/519
[58] Field of Search ........................... 62/68, 342; 99/453, 99/455; 165/61, 64, 66; 426/519, 522–524

[56] References Cited

U.S. PATENT DOCUMENTS

| 1,442,945 | 1/1923 | Hauk . | |
| 1,735,395 | 11/1929 | Hiller . | |
| 2,515,722 | 7/1950 | Maranz . | |
| 2,558,449 | 6/1951 | Maranz . | |
| 2,746,260 | 5/1956 | Swenson . | |
| 3,291,200 | 12/1996 | Lutz | 62/342 |
| 3,858,498 | 1/1975 | Swenson . | |
| 3,930,535 | 1/1976 | Manzel | 165/64 |
| 4,316,490 | 2/1982 | Meyer . | |
| 4,476,146 | 10/1984 | Manfroni | 426/522 |
| 4,680,944 | 7/1987 | Menzel | 165/61 |
| 4,703,628 | 11/1987 | Togashi et al. . | |

FOREIGN PATENT DOCUMENTS

| 1 273 023 | 8/1961 | France . |
| 1 314 714 | 12/1962 | France . |
| WO 91/07085 | 5/1991 | WIPO . |

*Primary Examiner*—William E. Tapolcai
*Attorney, Agent, or Firm*—Oblon, Spivak, McClelland, Maier & Neustadt, P.C.

[57] ABSTRACT

A method for feeding a liquid mixture (11) to the beating cylinder (12, 30) of a soft ice-cream production machine, is characterised in that only a single measure of liquid mixture, withdrawn from a feed vessel (10), is firstly subjected to rapid heating to a temperature of around +85° C., then immediately afterwards to rapid pre-cooling, and is finally fed to a beating chamber (20) of said beating cylinder (12, 30) in which said mixture is beaten. This ensures that the measure is free from bacterial load.

10 Claims, 6 Drawing Sheets

METHOD FOR FEEDING A LIQUID MIXTURE TO THE BEATING CYLINDER OF A SOFT ICE-CREAM PRODUCTION MACHINE, AND AN APPARATUS FOR ITS IMPLEMENTATION

BACKGROUND OF THE INVENTION

1. Field of the Invention

This invention relates to an improved method for feeding a liquid mixture to the beating cylinder of a production machine for socalled soft ice-cream. The invention also relates to an apparatus for implementing said method.

2. Discussion of the Background

Various types of soft ice-cream production machines are well known to the expert of the art, these being machines for preparing and continuously dispensing portions of soft ice-cream in which the air content is generally around 70%, but can reach as high as 90%. One of these is described and illustrated for example in Italian patent No, 736,656 of Aug. 28 1964.

The machine of that patent comprises an upper mixture feed vessel and a lower beating cylinder connected together by a conduit. The feed vessel is provided with heating and cooling means, by which the mixture is pasteurized before being fed to the beating cylinder.

In machines of this type the entire mixture contained in the feed vessel above the beating cylinder is pasteurized by a traditional process of heating to about +85° C. followed by cooling to about +4° C.

When the machine is fully working, the beating cylinder is fed with pasteurized mixture to be beaten, via controlled communication with the overlying feed vessel, to dispense newly required portions of soft ice-cream.

When the mixture in the feed vessel has reached its bottom level the machine must be halted, and only in this state can a further quantity of mixture fed into the vessel be pasteurized. In this respect, it is impossible to pasteurize the mixture in the feed vessel when the underlying beating cylinder is in operation, this being usable only if red with mixture at a relatively low temperature (around +4° C.), so as not to melt the ice-cream undergoing beating.

Additionally, as is well known to the expert of the art, the mixture can be fed from the vessel to the underlying beating cylinder either by simple gravity fall or with the aid of a pump. Machines of the aforedescribed type suffer from two serious drawbacks.

The first and most important is the problem of hygiene, in that the pasteurized mixture can stagnate for even a considerable time in the feed vessel, which is usually not hermetically sealed but is in communication with the external environment. This favours rapid re-formation of a bacterial load unacceptable in the previously pasteurized mixture.

The second drawback is operational in that, as stated, the feed vessel can only be refilled, and its contained mixture be pasteurized, with the machine at rest.

SUMMARY OF THE INVENTION

The object of the present invention is to obviate the aforesaid drawbacks of the known art by providing a method by which it is absolutely certain that the mixture fed from the vessel to the beating cylinder has been pasteurized correctly, ie with its bacterial load within regulations, and by which the vessel can be refilled and the filled mixture be pasteurized with the machine in operation.

These and other objects are achieved according to a method and device for producing soft ice cream in which only a single measure of liquid mixture is withdrawn from a feed vessel. The single measure is rapidly heated to a temperature of approximately 85° C., and then rapidly cooled. Next, the single measure is fed to a beating chamber of a beating cylinder and beaten.

BRIEF DESCRIPTION OF THE DRAWINGS

The characteristics of the invention and its advantages over the known art will be more apparent from an examination of the following description given with reference to the accompanying schematic drawings, which show two different embodiments of apparatus suitable for implementing the method of the invention. On the drawings.

DESCRIPTION OF THE PREFERRED EMBODIMENT

Figure 1:
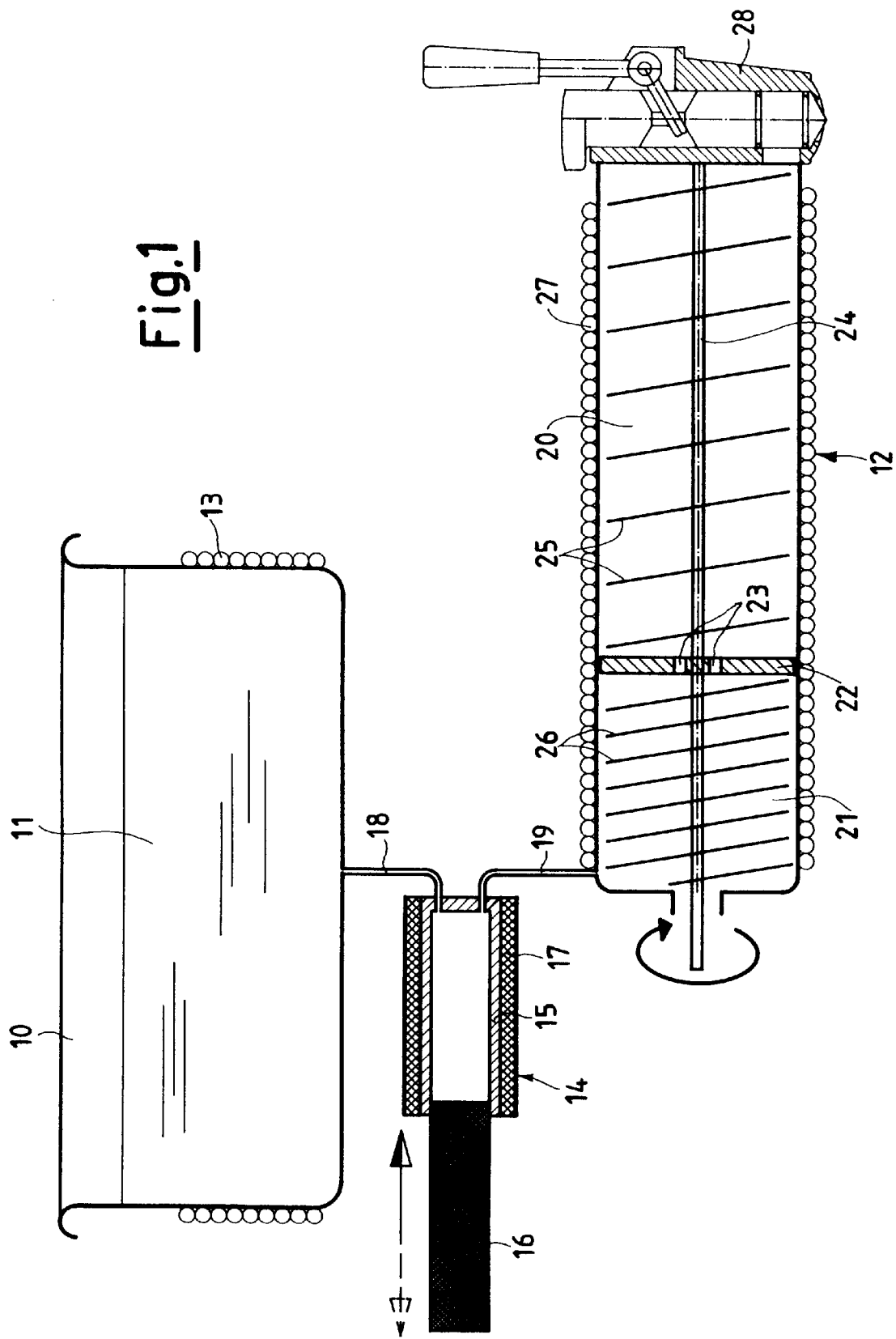
FIG. 1 is a schematic view showing a first embodiment of an apparatus for implementing the method of the invention, when drawing a measure from a vessel feeding the metering-heating unit.
Figure 2:
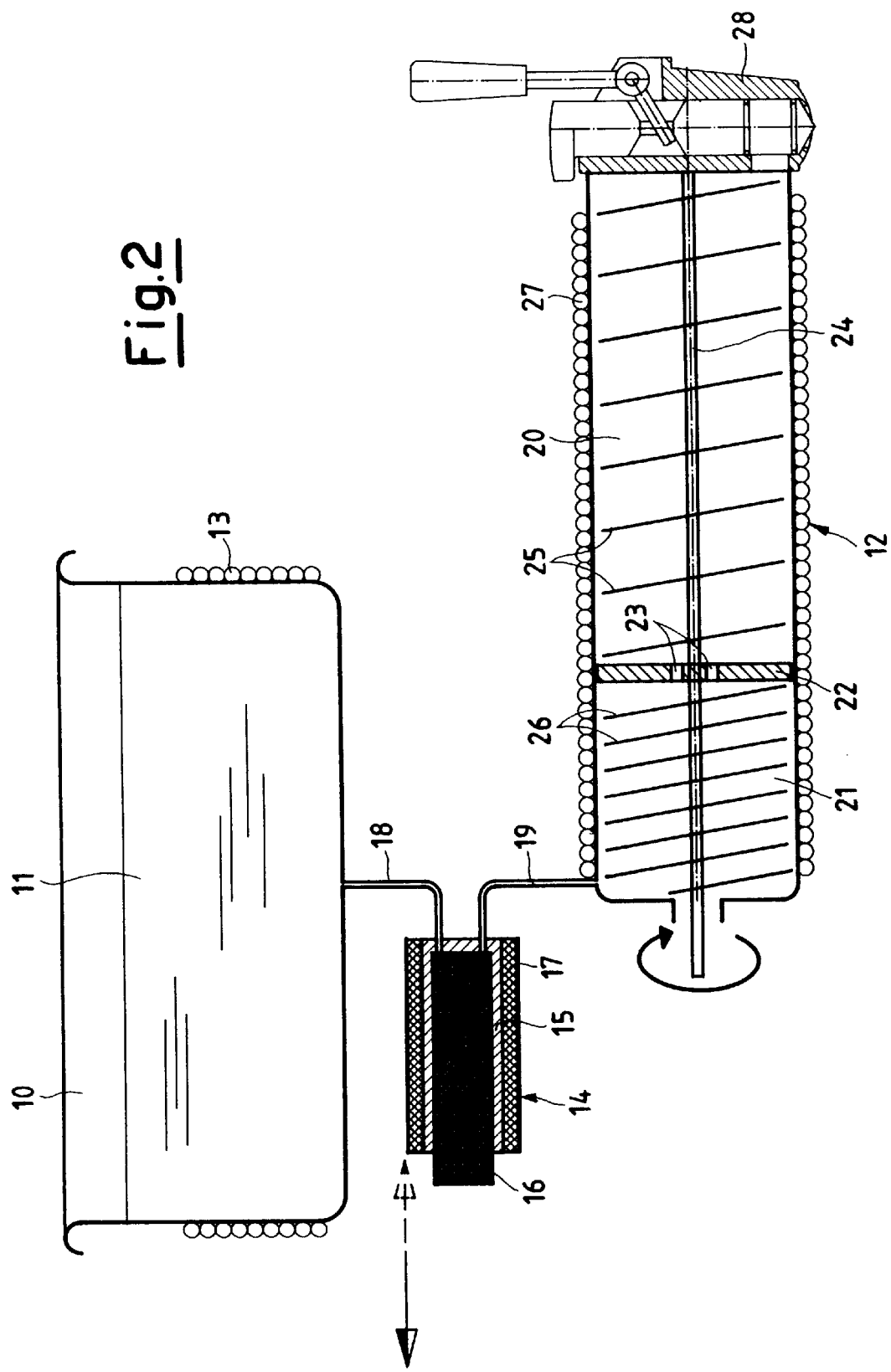
FIG. 2 is a view of the apparatus of FIG. 1 when pumping a measure from a metering-heating unit to a pre-cooling system.

With reference to FIGS. 1 and 2 of the drawings, the reference numeral 10 indicates a vessel for feeding a mixture 11, suitable for preparing soft ice-cream, to a beating cylinder indicated overall by 12.

The vessel 10 is cooled by a cooling system indicated schematically by 13, able to maintain the mixture 11 at a relatively low positive temperature, for example around +4° C. In a first embodiment of the present invention, a metering-heating unit 14 is provided between the vessel 11 and the beating cylinder 12.

In the illustrated embodiment the metering-heating unit 14 consists of a positive displacement pump comprising a cylinder 15 and piston 16, heating means 17 cooperating with the cylinder 15. Two conduits 18, 19, namely for suction and delivery respectively and controlled by suitable valves of known type (not shown), connect the metering unit 14 to the vessel 10 and to the beating cylinder 12.

According to the present invention, the beating cylinder 12 comprises, upstream of a traditional beating chamber 20, an additional chamber 21 for pre-cooling the measure of mixture 11 originating from the metering-heating unit 14. Said pre-cooling chamber 21 is separated from the beating chamber 20, for example by a partitioning baffle 22.

The mixture contained in the pre-cooling chamber 21, still in the fluid state, is fed into the beating chamber 20 through communication holes 23. The reference numeral 24 indicates the rotary mixer of the beating cylinder, which is provided with two sets of blades 25, 26 housed in the chambers 20, 21 respectively. The reference numeral 27 indicates the cooling system for the beating cylinder and 28 indicates the dispensing unit for the soft ice-cream.

The innovative method of the invention consists of:

drawing into the metering-heating unit 14 from the vessel 10 a measure of mixture 11 corresponding to one portion of soft ice-cream (or to multiples or submultiples thereof) and heating said measure of mixture 11 in the shortest possible time (a few seconds) to a temperature of around +85° C.; then feeding said measure of heated mixture to the beating cylinder 12 by making it first pass through the pre-cooling chamber 21, which cools it to a temperature of between about +10° C. and about +12° C.

The measure of pre-cooled mixture at about +10° C. to +12° C. is fed directly into the chamber 20 of the beating cylinder 12, which is at a temperature of about −35° C., so that it begins in a very short time to freeze. Any danger of bacteriological contamination is therefore prevented.

The aforesaid inventive concept is therefore to withdraw from the vessel 10, which can even be in communication with the external environment (not hermetically sealed), only a small measure of mixture corresponding to one portion of soft ice-cream (or to multiples or sub-multiples thereof), eliminate the bacteriological load of said measure of mixture by a very rapid heating process, pre-cool, and provide final cooling within the beating cylinder, with beating of the measure of mixture which has just been treated.

This attains the object of processing within the beating cylinder only a measure of mixture which has just been pasteurized, and hence under ideal bacteriological conditions for producing a soft ice-cream satisfying any health regulation.

It also attains the object of providing a machine in which the mixture feed vessel 10 can be filled even with the beating cylinder in operation, as the pasteurization process takes place in a region separated from said vessel.

Figure 3:
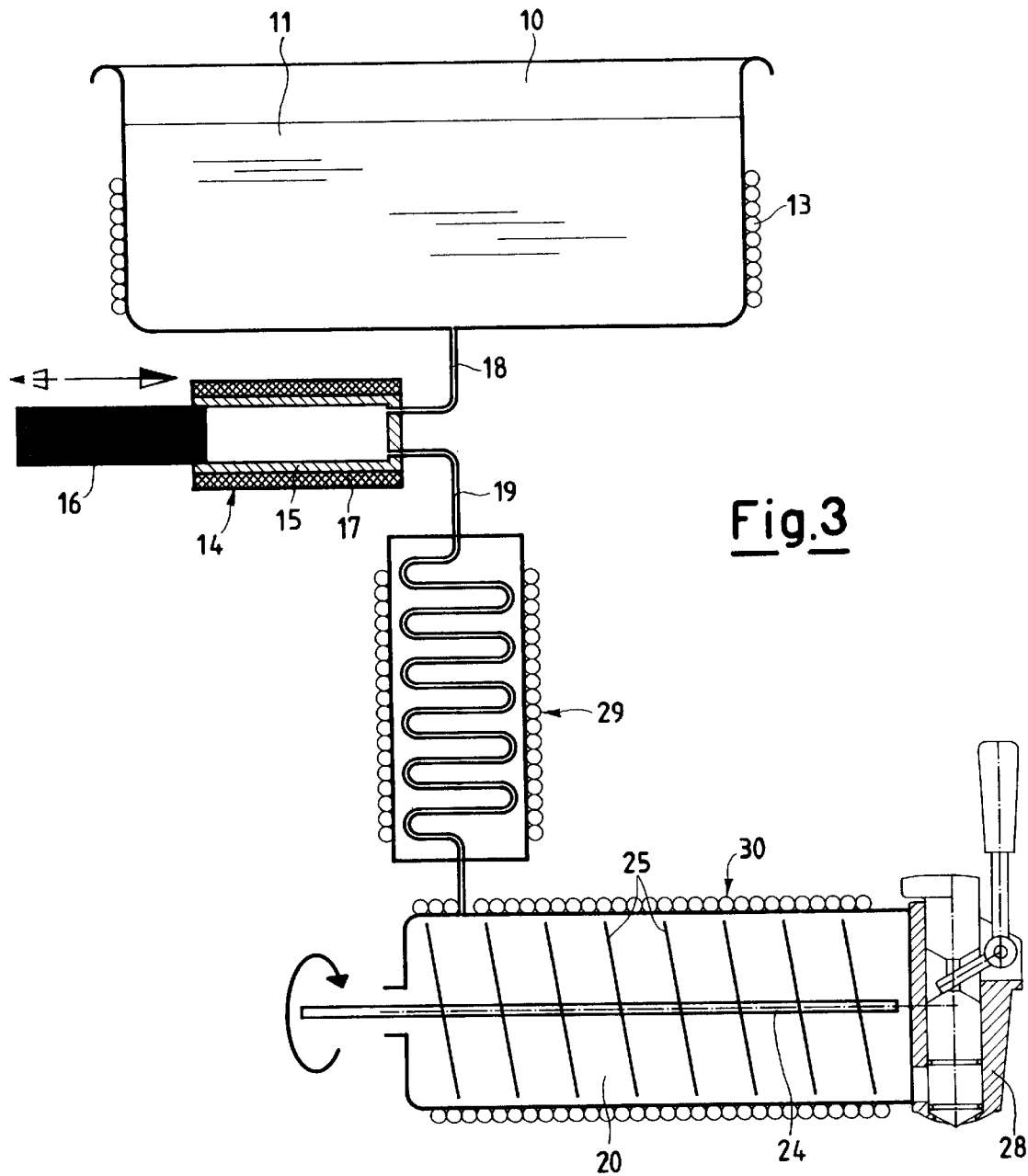
FIGS. 3 and 4 are two views similar to FIGS. 1 and 2 but showing a further possible embodiment of an apparatus for implementing the method of the invention.
Figure 4:
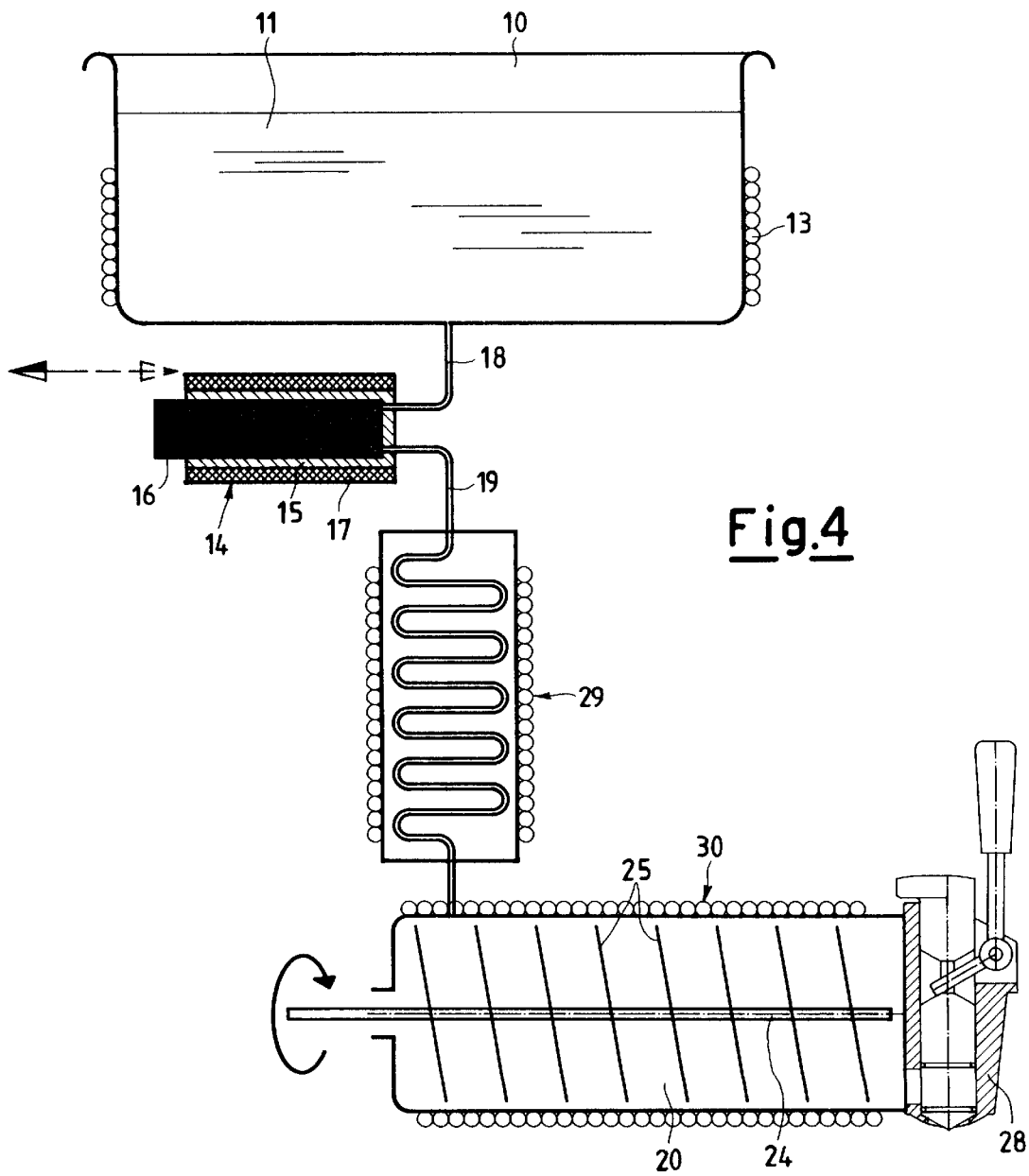
Figure 5:
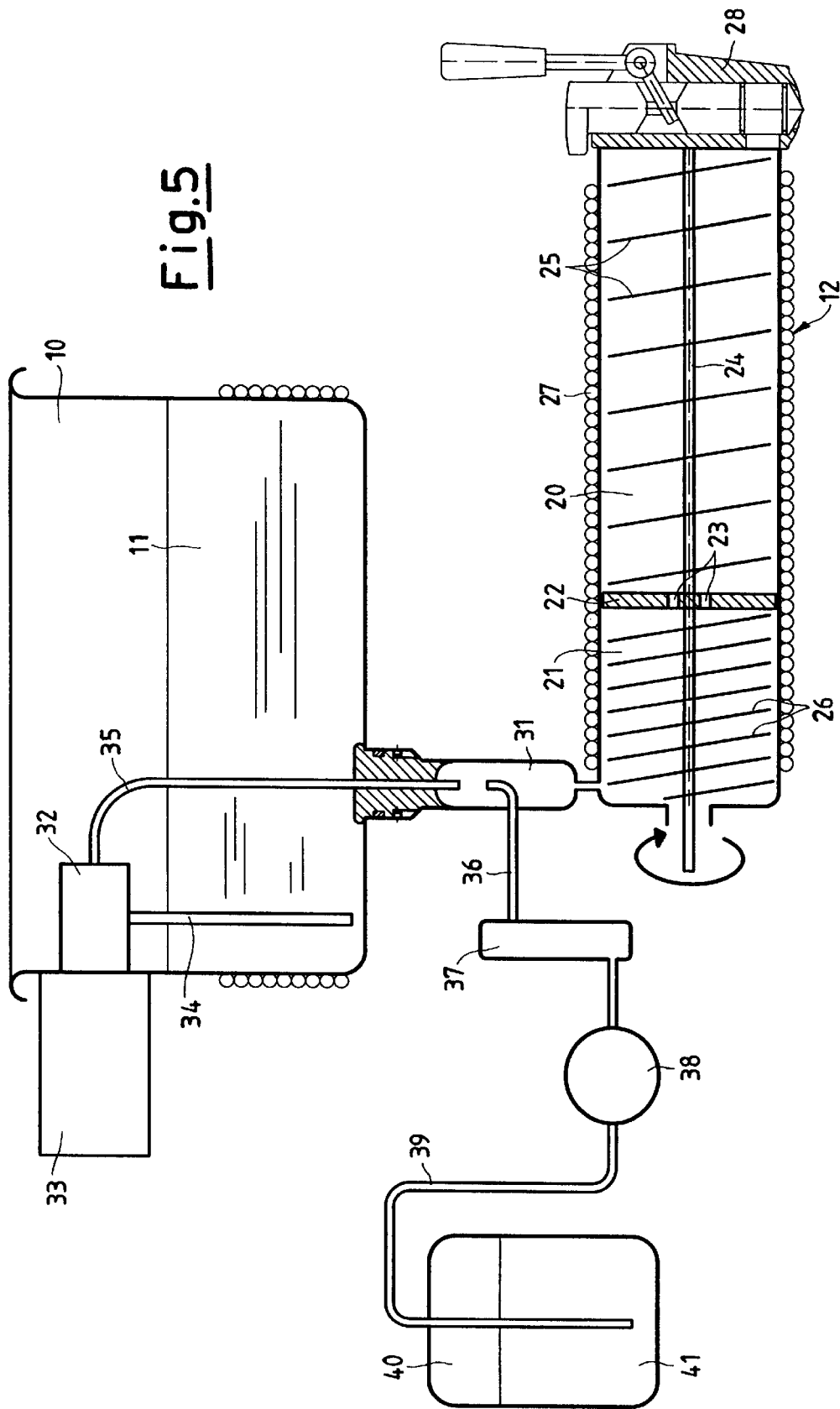
FIGS. 5 and 6 are two views showing respectively a further two possible embodiments of an apparatus for implementing the method of the invention.

FIGS. 3 and 4 show a further possible embodiment of an apparatus with which the method of the invention can be implemented. The apparatus or FIGS. 3 and 4 differs from that of FIGS. 1 and 2 by comprising for the heated measure of mixture a pre-cooling unit 29 positioned between the metering-heating unit 14 and a beating cylinder 30 which, in this case, can lack the pre-cooling chamber 21, and comprise only the beating chamber 20. FIG. 5 shows a further possible embodiment of an apparatus with which the method of the invention can be implemented.

The embodiment shown in FIG. 5 comprises a heating chamber 31 into which a measure of the mixture 11 contained in the vessel 10 is fed. The measure of mixture 11 is fed to the chamber 31 by a pump 32 driven by a motor 33, the pump 32 being provided with a suction (dip) tube 34 immersed in the mixture 11, and a delivery tube 35 which terminates in said heating chamber 31.

The measure of mixture 11 fed into the chamber 31 is heated in a very short time by a steam jet fed in counter-current. Said steam jet originates from a delivery tube 36 of a steam generator 37 fed by a pump 38 which, via a tube 39, dips into a reservoir 40 containing a store of water 41.

The measure of mixture heated in the heating chamber 31 is fed to the beating chamber 20 via an additional pre-cooling chamber 21, as in the embodiment shown in FIGS. 1 and 2.

Figure 6:
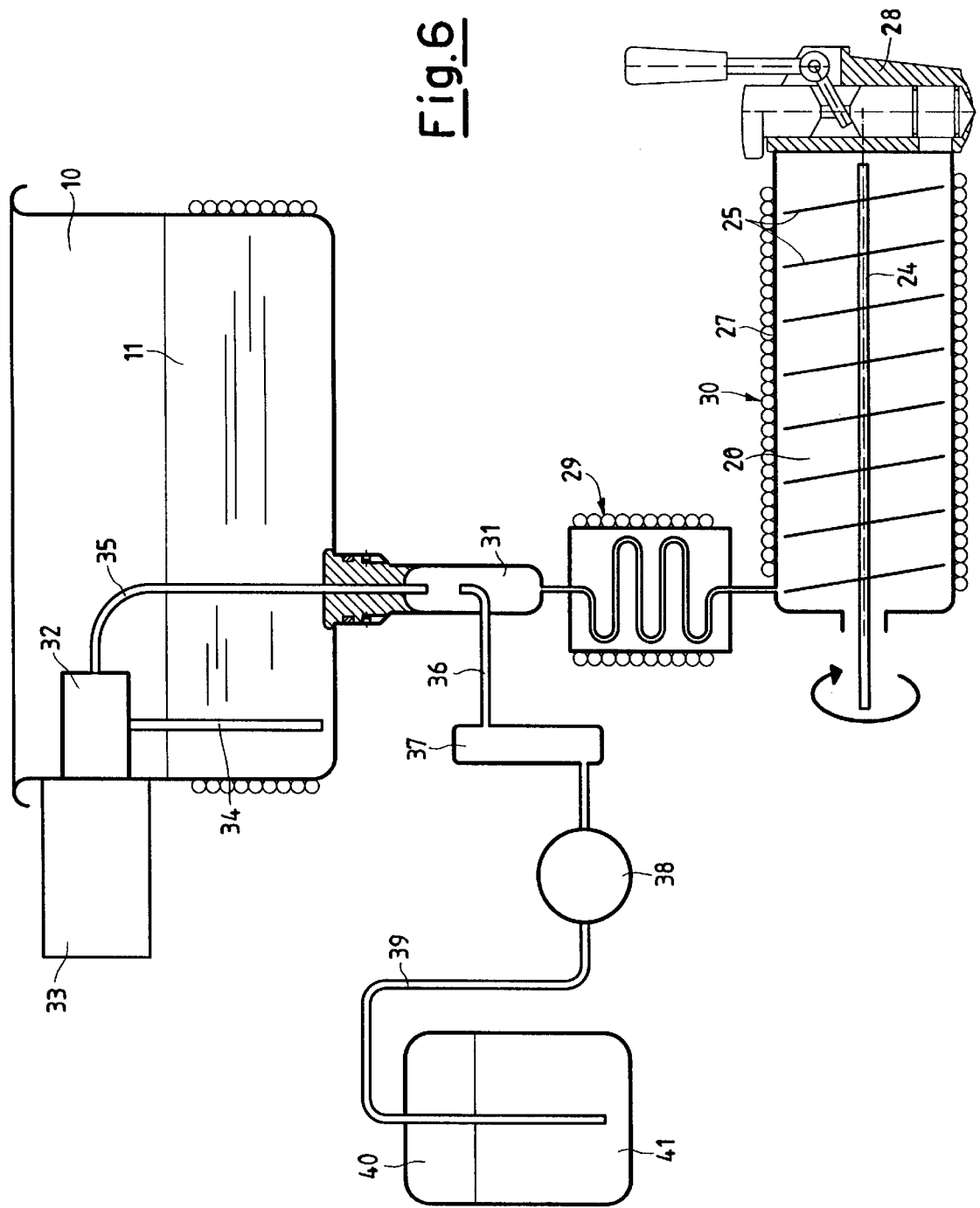

Finally, in a further possible embodiment shown in FIG. 6, the measure of mixture heated in the heating chamber 31 is fed to the beating chamber 20 after passing through a pre-cooling unit 29 for said heated measure of mixture, positioned external to the beating cylinder 30, as in the embodiment shown in FIGS. 3 and 4 of the drawings.

The objects stated in the introduction to the description are hence attained.

The scope of protection of the invention is defined by the following claims.

I claim:

1. A method for feeding a liquid mixture to a beating cylinder of a soft ice cream machine, comprising the steps of:

withdrawing only a single measure of liquid mixture from a feed vessel;

rapidly heating said single measure of liquid mixture to a temperature of approximately 85° C.;

rapidly cooling said single measure of liquid mixture after said heating step;

feeding said single measure of liquid mixture to a beating chamber of a beating cylinder; and beating said single measure of liquid mixture in said beating chamber.

2. The method of claim 1, further comprising the step of:

cooling said single measure of liquid mixture in said beating chamber.

3. A machine for producing soft ice cream, comprising:

a refrigerated vessel configured to contain a liquid mixture;

a metering unit configured to withdraw a single measure of liquid mixture from said refrigerated vessel, said metering unit including means for rapidly heating said single measure of liquid mixture;

a beating cylinder including a beating chamber; and a pre-cooling device configured to rapidly cool the single measure of liquid mixture after the single measure of liquid mixture is heated by the heating means and before the single measure of liquid mixture is fed to the beating chamber.

4. The device of claim 3, wherein:

the metering unit is a positive displacement metering unit including a cylinder and a piston.

5. The device of claim 3, wherein the pre-cooling system comprises:

a first chamber adjacent to the beating chamber of the beating cylinder.

6. The device of claim 5, wherein the pre-cooling, system further comprises:

a second chamber adjacent to the beating, chamber of the beating cylinder, said first chamber and said second chamber being separated by a partitioning baffle, said partitioning baffle defining a plurality of holes so that the first chamber and the second chamber are in communication with each other.

7. The device of claim 3, wherein the pre-cooling system comprises:

a refrigeration unit external to the beating cylinder and positioned between the metering unit and the beating cylinder.

8. A device for producing soft ice creamed, comprising:

a feed vessel;

a rapid heating chamber configured to hold a single measure of liquid mixture withdrawn from the feed vessel;

a steam generator opening into the rapid heating chamber;

a beating cylinder including a beating chamber; and a pre-cooling chamber connected to the rapid heating chamber and positioned adjacent to the beating chamber of the beating cylinder.

9. The device of claim 8, further comprising:

a metering pump configured to feed the single measure of liquid mixture to said rapid heating chamber from said feed vessel.

10. The device of claim 8, further comprising:

a refrigerate on unit external to the beating cylinder and connected to the rapid heating chamber.

* * * * *